(12) United States Patent
Piekniewski

(10) Patent No.: US 9,239,985 B2
(45) Date of Patent: Jan. 19, 2016

(54) APPARATUS AND METHODS FOR PROCESSING INPUTS IN AN ARTIFICIAL NEURON NETWORK

(71) Applicant: Brain Corporation, San Diego, CA (US)

(72) Inventor: Filip Piekniewski, San Diego, CA (US)

(73) Assignee: Brain Corporation, San Diego, CA (US)

( * ) Notice: Subject to any disclaimer, the term of this patent is extended or adjusted under 35 U.S.C. 154(b) by 272 days.

(21) Appl. No.: 13/922,116

(22) Filed: Jun. 19, 2013

(65) Prior Publication Data

US 2014/0379623 A1    Dec. 25, 2014

(51) Int. Cl.
| | | |
|---|---|---|
| *G06E 1/00* | (2006.01) | |
| *G06E 3/00* | (2006.01) | |
| *G06F 15/18* | (2006.01) | |
| *G06G 7/00* | (2006.01) | |
| *G06N 3/08* | (2006.01) | |
| *G06N 3/063* | (2006.01) | |
| *G06N 3/10* | (2006.01) | |
| *G06N 3/06* | (2006.01) | |
| *G06N 3/04* | (2006.01) | |

(52) U.S. Cl.
CPC ............ *G06N 3/08* (2013.01); *G06N 3/049* (2013.01); *G06N 3/04* (2013.01); *G06N 3/06* (2013.01); *G06N 3/063* (2013.01); *G06N 3/0635* (2013.01); *G06N 3/10* (2013.01)

(58) Field of Classification Search
None
See application file for complete search history.

(56) References Cited

U.S. PATENT DOCUMENTS

| | | |
|---|---|---|
| 5,063,603 A | 11/1991 | Burt |
| 5,138,447 A | 8/1992 | Shen et al. |
| 5,216,752 A | 6/1993 | Tam |
| 5,272,535 A | 12/1993 | Elabd |
| 5,355,435 A | 10/1994 | DeYong et al. |
| 5,638,359 A | 6/1997 | Peltola et al. |
| 5,652,594 A | 7/1997 | Costas |
| 5,673,367 A | 9/1997 | Buckley |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

From Spiking Neuron Models to Linear-Nonlinear Models Srdjan Ostojic1,2, Nicolas Brunel3 Jan. 2011 | vol. 7 | Issue 1 | e1001056.*

(Continued)

*Primary Examiner* — Kakali Chaki
*Assistant Examiner* — Ababacar Seck
(74) *Attorney, Agent, or Firm* — Gazdzinski & Associates, PC

(57) ABSTRACT

Apparatus and methods for processing inputs by one or more neurons of a network. The neuron(s) may generate spikes based on receipt of multiple inputs. Latency of spike generation may be determined based on an input magnitude. Inputs may be scaled using for example a non-linear concave transform. Scaling may increase neuron sensitivity to lower magnitude inputs, thereby improving latency encoding of small amplitude inputs. The transformation function may be configured compatible with existing non-scaling neuron processes and used as a plug-in to existing neuron models. Use of input scaling may allow for an improved network operation and reduce task simulation time.

20 Claims, 8 Drawing Sheets

(56) References Cited

U.S. PATENT DOCUMENTS

| | | | |
|---|---|---|---|
| 5,875,108 A | 2/1999 | Hoffberg et al. |
| 6,009,418 A | 12/1999 | Cooper |
| 6,014,653 A | 1/2000 | Thaler |
| 6,035,389 A | 3/2000 | Grochowski |
| 6,418,424 B1 | 7/2002 | Hoffberg et al. |
| 6,458,157 B1 | 10/2002 | Suaning |
| 6,509,854 B1 | 1/2003 | Morita |
| 6,545,705 B1 | 4/2003 | Sigel et al. |
| 6,545,708 B1 | 4/2003 | Tamayama |
| 6,546,291 B2 | 4/2003 | Merfield et al. |
| 6,581,046 B1 | 6/2003 | Ahissar |
| 6,625,317 B1 | 9/2003 | Gaffin et al. |
| 7,054,850 B2 | 5/2006 | Matsugu |
| 7,565,203 B2 | 7/2009 | Greenberg et al. |
| 7,580,907 B1 | 8/2009 | Rhodes |
| 7,639,886 B1 | 12/2009 | Rastogi |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,154,436 B2 | 4/2012 | Szajnowski |
| 8,160,354 B2 | 4/2012 | Paquier |
| 8,200,593 B2 | 6/2012 | Guillen |
| 8,281,997 B2 | 10/2012 | Moran et al. |
| 8,311,965 B2 | 11/2012 | Breitwisch |
| 8,315,305 B2 | 11/2012 | Petre |
| 8,346,692 B2 | 1/2013 | Rouat et al. |
| 8,390,707 B2 | 3/2013 | Yamashita |
| 8,416,847 B2 | 4/2013 | Roman |
| 8,467,623 B2 | 6/2013 | Izhikevich |
| 8,515,160 B1 | 8/2013 | Khosla et al. |
| 8,583,286 B2 | 11/2013 | Fleischer et al. |
| 8,712,939 B2 | 4/2014 | Szatmary et al. |
| 8,712,941 B2 | 4/2014 | Izhikevich et al. |
| 8,719,199 B2 | 5/2014 | Izhikevich et al. |
| 8,725,658 B2 | 5/2014 | Izhikevich et al. |
| 8,725,662 B2 | 5/2014 | Izhikevich et al. |
| 8,756,183 B1 | 6/2014 | Daily et al. |
| 8,775,341 B1 | 7/2014 | Commons |
| 8,793,205 B1 | 7/2014 | Fisher et al. |
| 8,943,008 B2 | 1/2015 | Ponulak et al. |
| 8,972,315 B2 | 3/2015 | Szatmary et al. |
| 8,977,582 B2 | 3/2015 | Richert |
| 8,983,216 B2 | 3/2015 | Izhikevich et al. |
| 8,990,133 B1 | 3/2015 | Ponulak et al. |
| 8,996,177 B2 | 3/2015 | Coenen |
| 2002/0038294 A1 | 3/2002 | Matsugu |
| 2003/0050903 A1 | 3/2003 | Liaw et al. |
| 2003/0216919 A1 | 11/2003 | Roushar |
| 2003/0222987 A1 | 12/2003 | Karazuba |
| 2004/0054964 A1 | 3/2004 | Bozdagi |
| 2004/0136439 A1 | 7/2004 | Dewberry |
| 2004/0170330 A1 | 9/2004 | Fogg |
| 2004/0193670 A1 | 9/2004 | Langan et al. |
| 2004/0220082 A1 | 11/2004 | Surmeier et al. |
| 2005/0015351 A1 | 1/2005 | Nugent |
| 2005/0036649 A1 | 2/2005 | Yokono et al. |
| 2005/0096539 A1 | 5/2005 | Leibig |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0174700 A1 | 7/2008 | Takaba |
| 2008/0199072 A1 | 8/2008 | Kondo |
| 2008/0201282 A1 | 8/2008 | Garcia et al. |
| 2008/0237446 A1 | 10/2008 | Oshikubo |
| 2009/0043722 A1 | 2/2009 | Nugent |
| 2009/0287624 A1 | 11/2009 | Rouat |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage et al. |
| 2010/0299296 A1 | 11/2010 | Modha et al. |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0134242 A1 | 6/2011 | Loubser |
| 2011/0137843 A1 | 6/2011 | Poon et al. |
| 2011/0160741 A1 | 6/2011 | Asano |
| 2011/0184556 A1 | 7/2011 | Seth et al. |
| 2011/0206122 A1 | 8/2011 | Lu |
| 2011/0235698 A1 | 9/2011 | Petre et al. |
| 2012/0011090 A1 | 1/2012 | Tang |
| 2012/0083982 A1 | 4/2012 | Bonefas |
| 2012/0084240 A1 | 4/2012 | Esser et al. |
| 2012/0109866 A1 | 5/2012 | Modha |
| 2012/0117012 A1 | 5/2012 | Szatmary et al. |
| 2012/0303091 A1 | 11/2012 | Izhikevich |
| 2012/0308076 A1 | 12/2012 | Piekniewski |
| 2012/0308136 A1* | 12/2012 | Izhikevich .................. 382/181 |
| 2012/0330872 A1 | 12/2012 | Esser et al. |
| 2013/0046716 A1 | 2/2013 | Chan et al. |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0103626 A1 | 4/2013 | Hunzinger |
| 2013/0117212 A1 | 5/2013 | Hunzinger et al. |
| 2013/0151450 A1 | 6/2013 | Ponulak |
| 2013/0204814 A1* | 8/2013 | Hunzinger et al. ............. 706/16 |
| 2013/0204820 A1 | 8/2013 | Hunzinger et al. |
| 2013/0218821 A1 | 8/2013 | Szatmary |
| 2013/0251278 A1 | 9/2013 | Izhikevich |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0304683 A1 | 11/2013 | Lo |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1* | 2/2014 | Sinyayskiy et al. ............ 706/25 |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Classification and Powerlaws: The Logarithmic Transformation (2006) Journal of the American Society for Information Science and Technology (forthcoming) Loet Leydesdorff & Stephen Bensman.*
Berkes and Wiskott, Slow feature analysis yields a rich repertoire of complex cell properties. *Journal of Vision* (2005) vol. 5 (6).

(56) References Cited

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs, cwi ,n11-sbolltedmblica6ond)hdthesislxif>.
Branca, "A Neural Network for Ego-Motion Estimation from Optical Flow", published 1995.
Brette et al., Brian: a simple and flexible simulator for spiking neural networks, The Neuromorphic Engineer, Jul. 1, 2009, pp. 1-4, doi: 10.2417/1200906.1659.
Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.
Bush, Daniel, "STDP, Rate-coded Hebbian Learning and Auto-Associative Network Models of the Hippocampus", Sep. 2008, University of Sussex, pp. 1-109.
Cessac et al. 'Overview of facts and issues about neural coding by spikes.' Journal of Physiology, Paris 104.1 (2010): pp. 5-18.
Chistiakova, Marina, and Maxim Volgushev. "Heterosynaptic plasticity in the neocortex." Experimental brain research 199.3-4 (2009): 377-390.
Cuntz et al., 'One Rule to Grow Them All: A General Theory of Neuronal Branching and Its Practical Application' PLOS Computational Biology, 6 (8), Published Aug. 5, 2010, pp. 1-14.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1-12(Suppl 1):P80.
Dorval et al. 'Probability distributions of the logarithm of inter-spike intervals yield accurate entropy estimates from small datasets.' Journal of neuroscience methods 173.1 (2008): 129-139, doi:10.1016/j.jneumeth.2008.05.013 28 pgs.
Fidjeland et al., Accelerated Simulation of Spiking Neural Networks Using GPUs [online],2010 [retrieved on Jun. 15, 2013], Retrieved from the Internet: URL:http:// ieeexplore.ieee.org/xpls/abs_all.jsp?ammber=5596678&tag=1.
Field, G.; Chichilnisky, E., Information Processing in the Primate Retina: Circuitry and Coding. *Annual Review of Neuroscience*, 2007, 30(1), 1-30.
Fiete, et al., Spike-Time-Dependent Plasticity and Heterosynaptic Competition Organize Networks to Produce Long Scale-Free Sequences of Neural Activity. *Neuron* 65, Feb. 25, 2010, pp. 563-576.
Floreano et al., 'Neuroevolution: from architectures to learning' Evol. Intel. Jan 2008 1:47-62, [retrieved Dec. 30, 2013] [retrieved online from URL:<http://inforscience.epfl.ch/record/112676/files/FloreanoDuerrMattiussi2008.pdf>.
FLORIAN03, Biologically inspired neural networks for the control of embodied agents, Technical Report Coneural-03-03 Version 1.0 [online], Nov. 30, 2003 [retrieved on Nov. 24, 2014]. Retrieved from the Internet: <URL:http://citeseerx.ist.psu.edu/viewdoc/download-?doi=10.1.1.216.4931&rep1&type=pdf>.
Földiák, P., Learning invariance from transformation sequences. *Neural Computation*, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gerstner et al. (1996) A neuronal learning rule for sub-millisecond temporal coding. *Nature* vol. 383 (6595) pp. 76-78.
Gewaltig et al., 'NEST (Neural Simulation Tool)', Scholarpedia, 2007, pp. 1-15, 2(4): 1430, doi: 10.4249/scholarpedia.1430.
Glackin, C.; Maguire, L.; McDaid, L., Feature extraction from spectra-temporal signals using dynamic synapses, recurrency, and lateral inhibition, Neural Networks (IJCNN), The 2010 International Joint Conference on DOI: 10.1109/IJCNN.2010.5596818 Publication Year: 2010, pp. 1-6.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet<URL:http://www.google.com/url?sa=t&rct=j&q=Giuck+%22STIMULUS+GENERALIZATION+AND+REPRESENTATION+1N+ADAPTIVE+N ETWORK+MODELS+OF +CATEGORY+LEARN I NG%22+ 1991.
Gollisch, Tim and Markus Meister (2008) Rapid Neural Coding in the Retina with Relative Spike Latencies. *Science* 319:1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098, 2 pgs.
Graham, Lyle J., The Surf-Hippo Reference Manual, http:// www.neurophys.biomedicale.univparis5. fr/-graham/surf-hippo-files/Surf-Hippo%20Reference%20Manual.pdf. Mar. 2002, pp. 1-128.
Hatsopoulos, "Visual Navigation with a Neural Network", published 1991.
Hopfield JJ (1995) Pattern recognition computation using action potential timing for stimulus representation. *Nature* 376: 33-36.
Huang, "Fall Detection Using Modular Neural Networks with Back-Projected Optical Flow", Published 2007.
Itti, Laurent, and Christof Koch. "Computational modelling of visual attention." Nature reviews neuroscience 2.3 (2001): pp. 194-203.
Izhikevich E. M. and Hoppensteadt F.C. (2009) Polychronous Wavefront Computations. *International Journal of Bifurcation and Chaos*, 19:1733-1739.
Izhikevich E.M. (2004) Which Model to Use for Cortical Spiking Neurons? *IEEE Transactions on Neural Networks*, 15:1063-1070.
Izhikevich E.M. (2006) Polychronization: Computation With Spikes. *Neural Computation*,18:245-282.
Izhikevich E,M., "Neural Excitability, Spiking and Bursting", Neurosciences Institute, Received Jun. 9, 1999, Revised Oct. 25, 1999, 1171-1266, 96 pages.
Izhikevich et al., 'Relating STDP to BCM', Neural Computation (2003) 15, 1511-1523.
Izhikevich, E.M. (2007) Dynamical Systems in Neuroscience: The Geometry of Excitability and Bursting, *The MIT Press*, 2007.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. *Network, Computation in Neural Systems*, 2006, 17 (1), 31-41.
Karbowski et al., 'Multispikes and Synchronization in a Large Neural Network with Temporal Delays', Neural Computation 12, 1573-1606 (2000).
Kazantsev, et al., "Active Spike Transmission in the Neuron Model With a Winding Threshold Maniford", Jan. 3, 2012, 205-211, 7 pages.
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Kling-Petersen, PhD, "Sun and HPC: From Systems to PetaScale" Sun Microsystems, no date, 31 pages.
Knoblauch, Andreas, Gunther Palm, and Friedrich T. Sommer. "Memory capacities for synaptic and structural plasticity." Neural Computation 22.2 (2010): 289-341.
Knoblauch, et al., Memory Capacities for Synaptic and Structural Plasticity, Neural Computation, 2009, pp. 1-45.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.

(56) References Cited

OTHER PUBLICATIONS

Laurent, 'The Neural Network Query Language (NNQL) Reference' [retrieved on Nov. 12, 2013]. Retrieved from the Internet: <URL'https://code.google.com/p/nnql/issues/detail?id=1>.

Lazar et al. 'A video time encoding machine', in Proceedings of the 15th IEEE International Conference on Image Processing (ICIP '08}, 2008, pp. 717-720.

Lazar et al. 'Consistent recovery of sensory stimuli encoded with MIMO neural circuits.' Computational intelligence and neuroscience (2010): 2, 13 pgs.

Lazar et al. 'Multichannel time encoding with integrate-and-fire neurons.' Neurocomputing 65 (2005): 401-407.

Leydesdorff, Loet and Stephen Bensman, Classification and Powerlaws: The Logarithmic Transformation (2006), Journal of the American Society for Information Science and Technology (forthcoming).

Li, Zhaoping. "A saliency map in primary visual cortex." Trends in cognitive sciences 6.1 (2002): 9-16.

Markram, Henry, et al. "Regulation of synaptic efficacy by coincidence of postsynaptic APs and EPSPs." Science 275.5297 (1997): 213-215.

Martinez-Perez, et al., "Automatic Activity Estimation Based on Object Behavior Signature", 2010, 10 pages.

Masquelier and Thorpe, Learning to recognize objects using waves of spikes and Spike Timing-Dependent Plasticity. *Neural Networks* (IJCNN), *The 2010 International Joint Conference on DOI*—10.1109/IJCNN.2010.5596934 (2010) pp. 1-8.

Masquelier, Timothee, "Learning Mechanisms to Account for Speed, Selectivity and Invariance of Responses in the Visual Cortex", phD Thesis published by U.F.R. Sciences de la Vie et de la Terre, Universite Toulouse III—Paul Sabatier, 2008 pp. 1-194.

Masquelier, Timothee. 'Relative spike time coding and STOP-based orientation selectivity in the early visual system in natural continuous and saccadic vision: a computational model.' Journal of computational neuroscience 32.3 (2012): 425-441.

Matsugu, et al., "Convolutional Spiking Neural Network for Robust Object Detection with Population Code Using Structured Pulse Packets", 2004, 39-55, 17 pages.

Medini, C.; Subramaniyam, S.; Nair, B.; Diwakar, S., Modeling cerebellar granular layer excitability and combinatorial computation with spikes, Bio-Inspired Computing: Theories and Applications (BIC-TA), 2010 IEEE Fifth International Conference on DOI: 10.1109/BICTA.201 0.5645274, Publication Year: 2010, pp. 1495-1503.

Meinhardt, Hans, and Alfred Gierer. "Pattern formation by local self-activation and lateral inhibition." Bioessays 22.8 (2000): 753-760.

Meister, M., Multineuronal codes in retinal signaling. *Proceedings of the National Academy of sciences.* 1996, 93, 609-614.

Meister, M.; Berry, M.J. The neural code of the retina, *Neuron.* 1999, 22, 435-450.

Nichols, A Re configurable Computing Architecture for Implementing Artificial Neural Networks on FPGA, Master's Thesis, The University of Guelph, 2003, pp. 1-235.

Niv, et al., Evolution of Reinforcement Learning in Uncertain Environments: A Simple Explanation for Complex Foraging Behaviors, International Society for Adaptive Behavior, 2002, vol. 10(1), pp. 5-24.

Oster M., Lichtsteiner P., Delbruck T, Liu S. A Spike-Based Saccadic Recognition System. *ISCAS 2007. IEEE International Symposium on Circuits and Systems,* 2009, pp. 3083-3086.

Ostojic, Srdjan, Nicolas Brunel, From Spiking Neuron Models to Linear-Nonlinear Models, Jan. 2011,vol. 7, Issue I, e1001056.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com], 47 pgs.

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=repl&type=pdf.

Ramachandran, et al., "The Perception of Phantom Limbs", The D.O. Hebb Lecture, Center for Brain and Cognition, University of California, 1998, 121, 1603-1630, 28 pages.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence,* 18, No. 6, Jun. 1996.

Ruan, Chengmei; Qingxiang Wu; Lijuan Fan; Zhigiang Zhuo; Xiaowei Wang, Competitive behaviors of a spiking neural network with spike timing dependent plasticity, Biomedical Engineering and Informatics (BMEI), 2012 5th International Conference on DOI: 10.11 09/BMEI.2012.6513088 Publication Year: 2012 , pp. 1015-1019.

Sanchez, Efficient Simulation Scheme for Spiking Neural Networks, *Doctoral Thesis, Universita di Granada* 28 Mar. 2008, pp. 1-104.

Sato et al., 'Pulse interval and width modulation for video transmission.' Cable Television, IEEE Transactions on 4 (1978): 165-173.

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.

Schnitzer, M.J.; Meister, M.; Multineuronal Firing Patterns in the Signal from Eye to Brain. *Neuron,* 2003, 37, 499-511.

Serrano-Gotarredona, et al, "On Real-Time: AER 2-D Convolutions Hardware for Neuromorphic Spike-based Cortical Processing", Jul. 2008.

SIMULINK.RTM. model [online], [Retrieved on Dec. 10, 2013] Retrieved from URL: http://www.mathworks.com/products/simulink/index.html> (2 pgs).

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Stringer, et al., "Invariant Object Recognition in the Visual System with Novel Views of 3D Objects", 2002, 2585-2596, 12 pages.

Swiercz, Waldemar, et al. "A new synaptic plasticity rule for networks of spiking neurons." Neural Networks, IEEE Transactions on 17.1 (2006) 94-105.

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#> (11 pgs).

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe, S.J., Delorme, A. & Vanrullen, R. (2001). Spike-based strategies for rapid processing. *Neural Networks* 14, pp. 715-725.

Thorpe, S.J., Guyonneau, R., Guilbaud, N., Allegraud, J-M. & Vanrullen, R. (2004). SpikeNet: real-time visual processing with one spike per neuron. *Neurocomputing,* 58-60, pp. 857-864.

Thorpe, Ultra-Rapid Scene Categorization with a Wave of Spikes. In H.H. Bulthoff et al. (eds.), Biologically Motivated Computer Vision, Lecture Notes in Computer Science, 2002, 2525, pp. 1-15, Springer-Verlag, Berlin.

Van Rullen R.; Thorpe, S. Rate Coding versus temporal order coding: What the Retinal ganglion cells tell the visual cortex. *Neural computation,* 2001, 13, 1255-1283.

Vanrullen, R. & Koch, C. (2003). Is perception discrete or continuous? *Trends in Cognitive Sciences* 7(5), pp. 207-213.

Vanrullen, R., Guyonneau, R. & Thorpe, S.J. (2005). Spike times make sense. *Trends in Neurosciences* 28(1).

Venkateswaran, V, et al, "A Novel Perspective into the Neuronal Encoding Along the Retinal Pathway Employing Time-Frequency

(56) References Cited

OTHER PUBLICATIONS

Transformation: Part II—For Color", Brain Inspired Cognitive Systems—BICS'2004, Aug. 29-Sep. 1, 2004, University of Stirling, Scotland, UK, Sep. 1, 2004 pp. BIS4-3 1-7.

Vislay-Meltzer, Rebecca, et al. "Spatiotemporal Specificity of Neuronal Activity Directs the Modification of Receptive Fields in the Developing Retinotectal System", Neuron 50, Apr. 6, 2006 pp. 101-114.

Voutsas, K.; Adamy, J., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wade, J.J.; McDaid, L.J.; Santos, J.A.; Sayers, H.M., SWAT: A Spiking Neural Network Training Algorithm for Classification Problems, Neural Networks, IEEE Transactions on vol. 21, Issue: 11 DOI: 10.11 09/TNN.2010.2074212, Publication Year: 2010, pp. 1817-1830.

Wallis, G.; Rolls, E. T. A model of invariant object recognition in the visual system. *Progress in Neurobiology.* 1997, 51, 167-194.

Wang, 'The time dimension for scene analysis.' Neural Networks, IEEE Transactions on 16.6 (2005): 1401-1426.

Wennekers, T., Analysis of spatia-temporal patterns in associative networks of spiking neurons Artificial Neural Networks, 1999. ICANN 99. Ninth International Conference on (Conf. Publ. No. 470) vol. 1 DOI: 10.1049/cp:19991116 Publication Year: 1999, pp. 245-250, vol. I.

Wiskott, L.; Sejnowski, T.J. Slow feature analysis: Unsupervised learning of invariances. *Neural Computation*, 2002, 14, (4), 715-770.

Wu, QingXiang et al., Edge Detection Based on Spiking Neural Network Model, ICIC 2007, LNAI 4682, pp. 26-34, 2007, Springer-Verlag, Berlin Heidelberg.

Wu, QingXiang, et al. "Remembering Key Features of Visual Images based on Spike Timing Dependent Plasticity of Spiking Neurons." Image and Signal Processing, 2009. CISP '09. $2^{ND}$ International Congress on. IEEE. 2009.

Wysoski, Simei Gomes et al., "Fast and adaptive network of spiking neurons for multi-view visual pattern recognition," Neurocomputing, vol. 71, Issues 13-15, Aug. 2008, pp. 2563-2575, ISSN 0925-2312, http://dx.doi.org/10.1016/j.neucom.2007.12.038.

Zarandy, et al., "Bi-i: A Standalone Ultra High Speed Cellular Vision System", Jun. 2005.

Zhou, "Computation of Optical Flow Using a Neural Network" Published 1988.

\* cited by examiner

APPARATUS AND METHODS FOR PROCESSING INPUTS IN AN ARTIFICIAL NEURON NETWORK

RELATED APPLICATIONS

This application is related to co-owned and co-pending U.S. patent application Ser. No. 13/922,143 entitled "INCREASED DYNAMIC RANGE ARTIFICIAL NEURON NETWORK APPARATUS AND METHODS" filed contemporaneously herewith on Jun. 19, 2013, incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates generally to artificial neuron networks and more particularly in one exemplary aspect to computerized apparatus and methods for encoding sensory input using spiking neuron networks.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting discrete temporal events, typically on the order of 1-2 milliseconds (ms). Several exemplary embodiments of such encoding are described in a commonly owned and co-pending U.S. patent application Ser. No. 13/152,084 entitled "APPARATUS AND METHODS FOR PULSE-CODE INVARIANT OBJECT RECOGNITION", filed Jun. 2, 2011, and U.S. patent application Ser. No. 13/152,119, filed Jun. 2, 2011, entitled "SENSORY INPUT PROCESSING APPARATUS AND METHODS", each incorporated herein by reference in its entirety.

A typical artificial spiking neural network, may comprise a plurality of units (or nodes), which may correspond to neurons in a biological neural network. A given unit may be connected to one (or more) other units via connections, also referred to as communication channels, or synaptic connections. The units providing inputs to a given unit may be referred to as the pre-synaptic units, while the unit receiving the inputs may be referred to as the post-synaptic unit.

In some applications, a unit of the network may receive inputs from multiple input synapses (up to 10,000). A neuron dynamic process may be configured to adjust neuron parameters (e.g., excitability) based on, for example, a sum of inputs $I_j$ received via unit's input connections as:

$$I \sim \Sigma_j I_j \quad \text{(Eqn. 1)}$$

As number of connections into a neuron increases, multiple spiking inputs may overwhelm the neuron process and may cause burst spiking, reduce neuron sensitivity to individual inputs, and may require manipulation of connection parameters (e.g., by using hard and or soft weight limits) in order to prevent network instabilities. Accordingly, methods and apparatus are needed which, inter alia, overcome the aforementioned disabilities.

SUMMARY

The present disclosure satisfies the foregoing needs by providing, inter alia, apparatus and methods for processing inputs to, e.g., a neuronal network.

In one aspect, a method of operating a node of network is disclosed. In one embodiment, the method includes: scaling individual inputs of a plurality of inputs received by the node via a plurality of connections, the scaling using at least a transformation to produce a plurality of scaled inputs; and updating a state of the node based on at least a combination of the scaled inputs, the updating configured to cause the node to generate a response based on at least the updated state of the node breaching a threshold.

In one implementation, individual ones of the plurality of connections are characterized by efficacy configured to advance or delay onset of the response generation; and an efficacy of a given one of the plurality of connections is configured to be adjusted based on at least a time interval between time of the response onset and a time of input of the plurality of inputs associated with the given connection.

In another implementation, the combination of the scaled inputs is configured to produce the combined input characterized by a first magnitude range; and the transformation is configured to convert input values within the first magnitude range into values within a second magnitude range, the second range comprising a prescribed upper end.

In yet another implementation, the transformation comprises a concave function of the input such as e.g., one or more of a logarithm and a power law characterized by an exponent value smaller than one.

In a further implementation, the input comprises first value, and second value configured such that is larger than the first value; and the transformation comprises a concave function of the input, the function configured to increase the first value to produce a third value, and to decrease the second value to produce a fourth value.

In another aspect of the disclosure, a computerized apparatus is disclosed. In one embodiment, the apparatus is configured to convert multiple signals into a latency of a spike, and includes: first logic configured to combine individual ones of the multiple signals into a combined signal; second logic in communication with the first logic and configured to transform the combined signal using at least a concave transformation to produce a transformed signal; and third logic in communication with the second logic configured to generate the spike based on at least the transformed signal.

In one implementation, the latency is configured based at least on a function of the transformed signal.

In another implementation, the function is configured to produce first and second latency values based on first and second values of the transformed signal, respectively; and a first ratio of the first latency value to the second latency value is greater than a second ratio of the first value of the transformed signal to the second value of the transformed signal.

In another aspect, a computerized neuron network is disclosed. In one embodiment, the network includes: at least one neuron configured to receive a plurality of inputs via a plurality of connections; and logic in communication with the at least one neuron and configured to transform the plurality of inputs to produce a scaled input in accordance with a rule.

In one implementation, the logic is configured to implement the rule comprising: based on the input being within a range, the scaled input being set equal to the input; and based on the input being outside the range, configure the scaled input based on at least a nonlinear concave transformation of the plurality of inputs.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
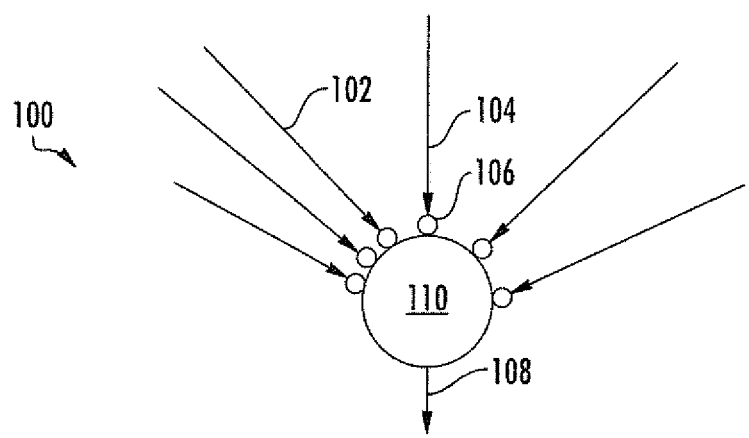
FIG. 1 is a graphical illustration of a network comprising a unit with multiple input connections, according to one or more implementations.

All Figures disclosed herein are © Copyright 2013 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2

SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, in one salient aspect, apparatus and methods for implementing mechanism for processing of excitatory stimulus by a node of computerized neuron network. The stimulus may be based on sensory input may comprise, for example, an audio signal, a stream of video frames, and/or other input. In some implementations, such as described with respect to FIG. 10 below) the sensory input may comprise image frames received from an image sensor (such as a charge-coupled device (CCD), CMOS device, and/or an active-pixel sensor (APS), photodiode arrays, etc.). In one or more implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

Referring now to FIG. 1, one implementation of a network comprising a unit configured to receive multiple inputs is shown and described. The network 100 may comprise neuron 110 coupled to multiple connections (e.g., 102, 104). Individual connections may be characterized by connection efficacy, denoted by circle 106. Connection efficacy, which in general may refer to a magnitude and/or probability of input spike influence on neuronal response (i.e., output spike generation or firing), and may comprise, for example a parameter—synaptic weight—by which one or more state variables of post synaptic unit are changed). During operation of the pulse-code network), synaptic weights may be dynamically adjusted using what is referred to as the spike-timing dependent plasticity (STDP) in order to implement, among other things, network learning. In one or more implementations, the STDP mechanism may comprise a rate-modulated plasticity mechanism such as for example that described in U.S. patent application Ser. No. 13/774,934, entitled "APPARATUS AND METHODS FOR RATE-MODULATED PLASTICITY IN A SPIKING NEURON NETWORK", and/or bi-modal plasticity mechanism, for example, such as described in U.S. patent application Ser. No. 13/763,005, entitled "SPIKING NETWORK APPARATUS AND METHOD WITH BIMODAL SPIKE-TIMING DEPENDENT PLASTICITY", each of the foregoing being incorporated herein by reference in its entirety.

Various neuron dynamic processes may be utilized with the methodology of the present disclosure including for example, integrate-and-fire (IF), Izhikevich simple model, spike response process (SRP), stochastic process such as, for example, described in U.S. patent application Ser. No. 13/487,533, entitled "SYSTEMS AND APPARATUS FOR IMPLEMENTING TASK-SPECIFIC LEARNING USING SPIKING NEURONS", filed Jun. 4, 2012, incorporated herein by reference in its entirety. In some implementations, the network may comprise heterogeneous neuron population comprising neurons of two or more types governed by their respective processes.

The unit 110 may receive inputs from thousands of connections (up to 10,000 in some implementations). Dynamic process of the unit 110 may be configured to adjust process parameters (e.g., excitability) based on magnitude of received inputs. Unit process may be updated at time intervals. In some implementations, the process update may be effectuated on a periodic basis at $\Delta t=1$ ms intervals. For a given update at time t, inputs $S_j$ received by the unit 110 via i-th connection (e.g., element 104 in FIG. 1) within time interval $\Delta t$ since preceding update (at time $t-\Delta t$) may be expressed as:

$$I_j = \{S_j(t-\Delta t:t)\}, S_j(t) \sim w_j(t)) \qquad \text{(Eqn. 2)}$$

where $w_j(t)$ denotes efficacy associated with j-th connection at spike time.

Input of Eqn. 2 may contribute to adjustment of unit excitability at time t as described below with respect to Eqn. 10 through Eqn. 16. It may be desirable to configure process of neuron 110 to operate in a near sub-threshold regime, wherein inputs from any two connections (e.g., 104, 102 in FIG. 1) may cause neuron response (e.g., generate spike output). In some implementations such sub-threshold operation may be configured to enhance sensitivity to lower amplitude inputs, compared to the prior art. The sensitivity enhancement may be effectuated based on, in one implementation, the exemplary nonlinear input summation methodology described in detail below.

The methodology may comprise transforming the input using a nonlinear concave function, e.g., expressed for a given x, y in the interval, as:

$$f(tx+(1-t)y) \geq tf(x)+(1-t)f(y). \quad \text{(Eqn. 3)}$$

where t may be selected from an interval [0,1].

Figure 2:
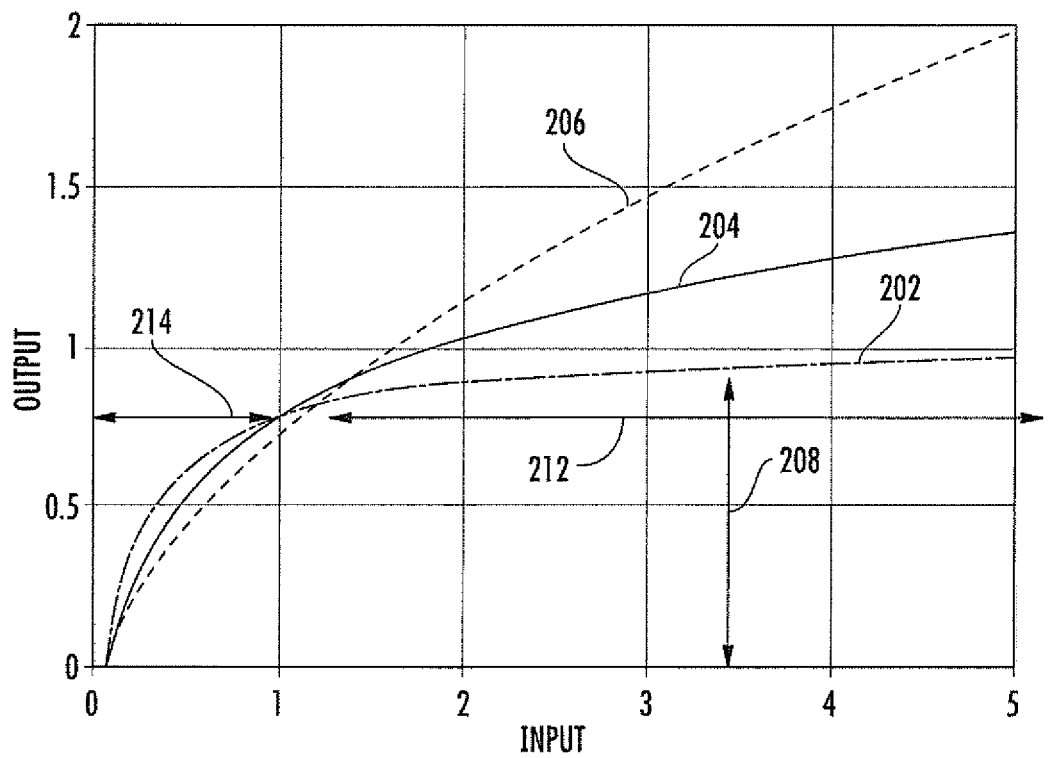
FIG. 2 is a plot depicting input-output relationship of neuron input transformer, according to one or more implementations.

FIG. 2 illustrates various exemplary implementations, of concave nonlinear transform functions that may be utilized in order to scale input into neuron. Curves 204, 206 depict logarithmic and square root scaling; curve 202 depicts a scaling function that may be expressed in some implementations as:

$$f(I) = a1 + \frac{a2}{a3 + I}, \quad \text{(Eqn. 4)}$$
$$a1 = 1,$$
$$a2 = -1,$$
$$a3 = 0.1.$$

It is noteworthy that scaling of Eqn. 4 is configured to transfer input of wide (e.g., unknown magnitude) into output characterized by a known fixed range (e.g., from 0 to 1 in FIG. 2).

Figure 3A:
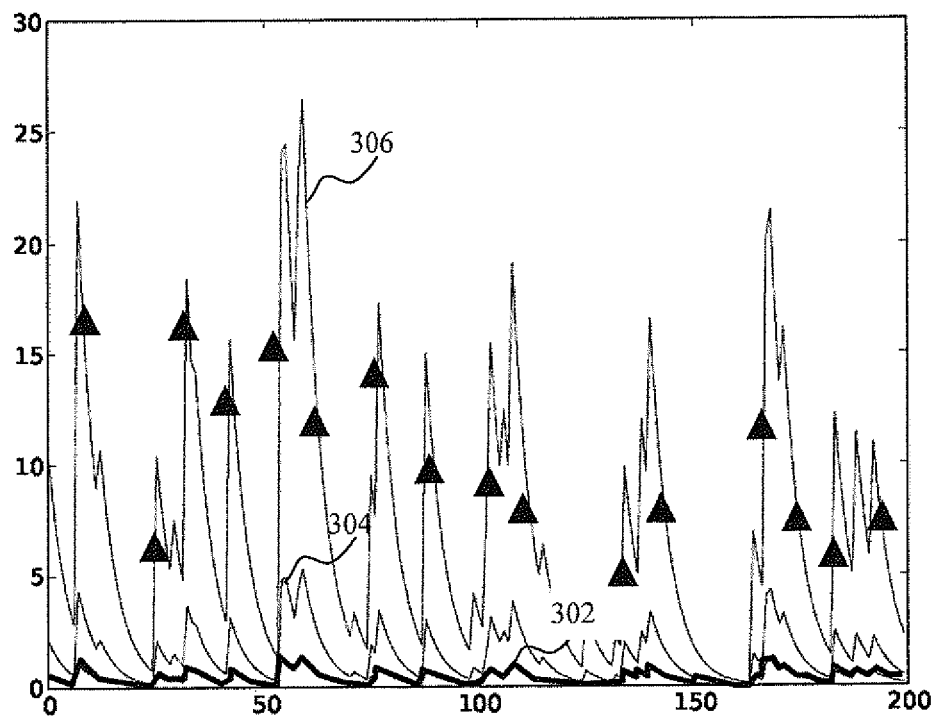
FIG. 3A is a plot depicting raw input into neuron, according to one or more implementations.
Figure 3B:
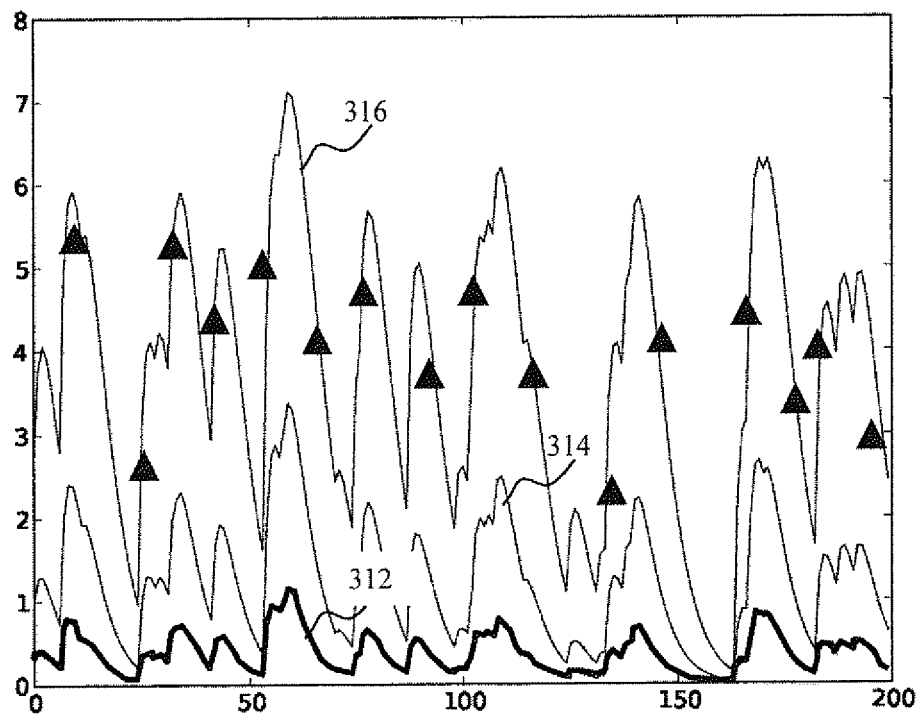
FIG. 3B is a plot depicting transformed input of FIG. 3A using input transformer of FIG. 2, according to one or more implementations.

FIGS. 3A-3B illustrate input scaling using the exemplary formulation of Eqn. 4. Curves 302, 304, 306 in FIG. 3A depict the magnitude of original input (associated with three individual connections) into a neuron as a function of time. Curves 312, 314, 316 in FIG. 3B depict the magnitude of scaled input (corresponding to the curves 302, 304, 306 of FIG. A, respectively).

In some implementations, at iteration time t, the cumulative input into a neuron may be determined as a linear combination of scaled inputs from one or more connections into the neuron, as follows:

$$\bar{I}_c(t) = F(\bar{I}_c(t-\Delta t) + \Sigma_j f(I_j)) \quad \text{(Eqn. 5)}$$

Various concave transformations may be utilized with Eqn. 5 including, for example, Eqn. 4, curves 202, 204 206 of FIG. 2 and/or other dependencies. In one or more implementations, the transformation may be characterized as follows:

$$f(a)+f(b) > f(a+b), a, b \in R \quad \text{(Eqn. 6)}$$

$$f(a)+f(b) < f(a+b), a, b \in R \quad \text{(Eqn. 7)}$$

A concave transformation (e.g., according to Eqn. 3 and/or Eqn. 6, Eqn. 6) may produce transformed output configured such that a sum of given transformed values a,b, is smaller than transform of a sum of the values wherein the values a,b belong to a range R1. In some implementations, (e.g., of a square root and/or logarithm) the range R1 may comprise the range from 1 to infinity. A concave transformation may produce transformed output configured such that a sum of given transformed values a,b, is greater than transform of a sum of the values wherein the values a,b belong to a range R2. In some implementations, (e.g., of a square root and/or logarithm) the range R2 may comprise the range from zero to 1. Such properties (e.g., Eqn. 6) may produce transformed combined input that is smaller in magnitude than the combined input thereby reducing input into a neuron.

In some implementations, wherein input comprises large magnitude signal (e.g., greater than 1), the input transformation may be configured in accordance with one of comprise one of Eqn. 6-Eqn. 6 dependencies, e.g., Eqn. 6. Range of inputs for one such realization is denoted by the arrow 212 in FIG. 2.

In some implementations, wherein input comprises small magnitude signal (e.g., less than 1), the input transformation may be configured in accordance with Eqn. 6 dependency. Range of inputs for such realization is denoted by the arrow 214 in FIG. 2. Transformations performed in accordance with one or Eqn. 6 and/or Eqn. 6 may be referred to as the one-sided transformations.

Neuron dynamic parameters (e.g., membrane potential) may be updated using, for example, the following update process:

$$v(t) \sim F(v(t-\Delta t), t, \bar{I}_c(t)) \quad \text{(Eqn. 8)}$$

where $\Delta t$ is iteration time step, and the function F( ) describes neuron process dynamics. Cumulative input of Eqn. 5 may be adjusted using for example the following decay formulation:

$$\bar{I}_c(t+\Delta t) = \alpha \bar{I}_c(t) \quad \text{(Eqn. 9)}$$

where the parameter $\alpha$ may be selected from the range between e.g., 0 and 0.9999 in some implementations.

In one or more implementations, the cumulative input into neuron process may be determined based on a linear combination of all inputs from one or more connections into the neuron:

$$\bar{I}(t) = \bar{I}(t-\Delta t) + \Sigma_j I_j, \quad \text{(Eqn. 10)}$$

Neuron dynamic parameters (e.g., membrane potential) may be updated based on transformed cumulative input (e.g., of Eqn. 10) as follows:

$$v(t) \sim F1(v(t-\Delta t), t, f(\bar{I}(t))) \quad \text{(Eqn. 11)}$$

where the function F1( ) denotes neuron dynamic process. Various concave transformations may be utilized with Eqn. 11Eqn. 11 including, for example, Eqn. 4, curves 202, 204 206 of FIG. 2 and/or other dependencies. The cumulative input of Eqn. 10 may be adjusted, in order to discount older observations, using the following decay formulation:

$$\bar{I}(t+\Delta r) = \gamma \bar{I}(t) \quad \text{(Eqn. 12)}$$

where the parameter $\gamma$ may be selected from the range between e.g., 0 and 0.9999 in some implementations.

In one or more implementations, the cumulative input into the neuron process at time t may be determined based on e.g., a scaled combination of previously scaled combined inputs at time t−∆t, and combined inputs from one or more connections into the neuron at time t, represented as:

$$\bar{I}_{c1}(t) = f(\bar{I}_{c1}(t-\Delta t) + \bar{I}_j) \quad \text{(Eqn. 13)}$$

Various concave transformations may be utilized with Eqn. 13, such as, for example, described above with respect to Eqn. 5. Neuron dynamic parameters (e.g., membrane potential) may be updated as follows:

$$v(t) \sim F2(v(t-\Delta t), t, \bar{I}_{c1}(t)) \quad \text{(Eqn. 14)}$$

where F3( ) describes neuron process dynamics. The cumulative input of Eqn. 13 may be adjusted in order, for example, to implement a "discount" of past observations, using the following decay formulation:

$$\bar{I}_{c1}(t+\Delta t) = \beta \bar{I}_{c1}(t) \quad \text{(Eqn. 15)}$$

where the parameter $\beta$ may be selected from the range between e.g., 0 and 0.9999 in some implementations. The transformation of the cumulative input $\bar{I}$ may be configured to provide output in a given range (e.g., [0, 10] in one or more implementations, as follows:

$$\bar{I}_{c2}(t) = f\left[\frac{a}{b+\bar{I}} - \bar{I}_{c2}(t-\Delta t)\right] \quad \text{(Eqn. 16)}$$

where parameters a,b may be configured to determine output range. By way of illustration, a parameter configuration of a=10, b=9 may provide an output in the range from 0 to 10.

In some implementations configured to implement input accumulation (e.g., history), the input transformation may be configured based on current cumulative input $\bar{I}(t)$, and a previous scaled input $\bar{I}_c(t-\Delta t)$, expressed as:

$$\bar{I}_c(t) = f(\bar{I}(t), \bar{I}_c(t-\Delta t)) \quad \text{(Eqn. 17)}$$

Decay of scaled input between iterations may be described, for example, as:

$$\bar{I}_c(t+\Delta t) = G(\bar{I}_c(t)), \quad \text{(Eqn. 18)}$$

where the function G( ) may comprise a multiplicative scaling by a constant (e.g., of Eqn. 15), and/or be described by a dynamic process (e.g., differential equation).

Input transformation of the disclosure (e.g., according to Eqn. 4, Eqn. 5, Eqn. 11, Eqn. 16 may be implemented using a software library, a software component, (e.g., a plug-into an existing neuron network realization), a hardware compressor (e.g., implemented in an integrated circuit such as an FPGA, an ASIC, and/or other), and/or using other realizations, including combinations of the foregoing.

In one or more implementations configured to enable plug-in functionality, the input transformation may be configured so as to preserve (e.g., pass through) input of a certain magnitude (e.g., 1) and/or magnitude range (e.g., between $I_{min}$ and $I_{max}$) as follows:

$$f(I_0) = I_0. \quad \text{(Eqn. 19)}$$

Unity gain of the realization of Eqn. 19 may be employed in order to enable compatibility of the input scaling methodology with existing neuron network implementations. In some implementations, the input scaling may be implemented into a portion of neurons, e.g., that may be receiving inputs from many (e.g., more than 1000) connections. The remaining neurons of the network may be configured to operate without input scaling.

In some implementations, the input scaling methodology described herein (e.g., with respect to Eqn. 3-Eqn. 19) may be effectuated using a look-up table (LUT) or other comparable data structure. In one such realization, the LUT utilization may comprise one or more logical operations configured to determine whether the input is within the scaling range (e.g., greater or equal $I_{max}$ or smaller than $I_{min}$) or within the bypass range (e.g., smaller than $I_{max}$ and greater or equal $I_{min}$).

The input scaling methodology described herein (e.g., with respect to Eqn. 4-Eqn. 19) may provide confined variations of input(s) into a neuron into a given range, enable more stable implementations of computerized neuron dynamic processes (e.g., characterized by faster convergence and/or reduced output variations), while still maintaining near sub-threshold regime of neuron operation (e.g., wherein inputs from any two connections (e.g., 104, 102 in FIG. 1) may cause neuron response).

It may be desired to utilize spiking neuron networks in order to encode sensory input into spike latency, such as for example as described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In some implementations, latency encoding may be employed for object recognition and/or classification may be implemented using spiking neuron classifier comprising conditionally independent subsets, such as e.g., that described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In some implementations, latency encoding may be employed for object recognition and/or classification may be implemented using spiking neuron classifier comprising conditionally independent subsets, such as e.g., that described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may be effectuated by a network comprising a plasticity mechanism such as, for example, the mechanisms described in U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/488,106, entitled "SPIKING NEURON NETWORK APPARATUS AND METHODS", filed Jun. 4, 2012, U.S. patent application Ser. No. 13/541,531, entitled "CONDITIONAL PLASTICITY SPIKING NEURON NETWORK APPARATUS AND METHODS", filed Jul. 3, 2012, U.S. patent application Ser. No. 13/548,071, entitled "SPIKING NEURON NETWORK SENSORY PROCESSING APPARATUS AND METHODS", filed Jul. 12, 2012, U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/691,554, entitled "RATE STABILIZATION THROUGH PLASTICITY IN SPIKING NEURON NETWORK", filed Nov. 30, 2012, each of the foregoing incorporated by reference herein in its entirety.

In some implementations, the input transformation methodology of the disclosure may be employed to extend the useful range of signal latency encoding, as described in detail with respect to the exemplary embodiment of FIG. 4 below.

Figure 4:
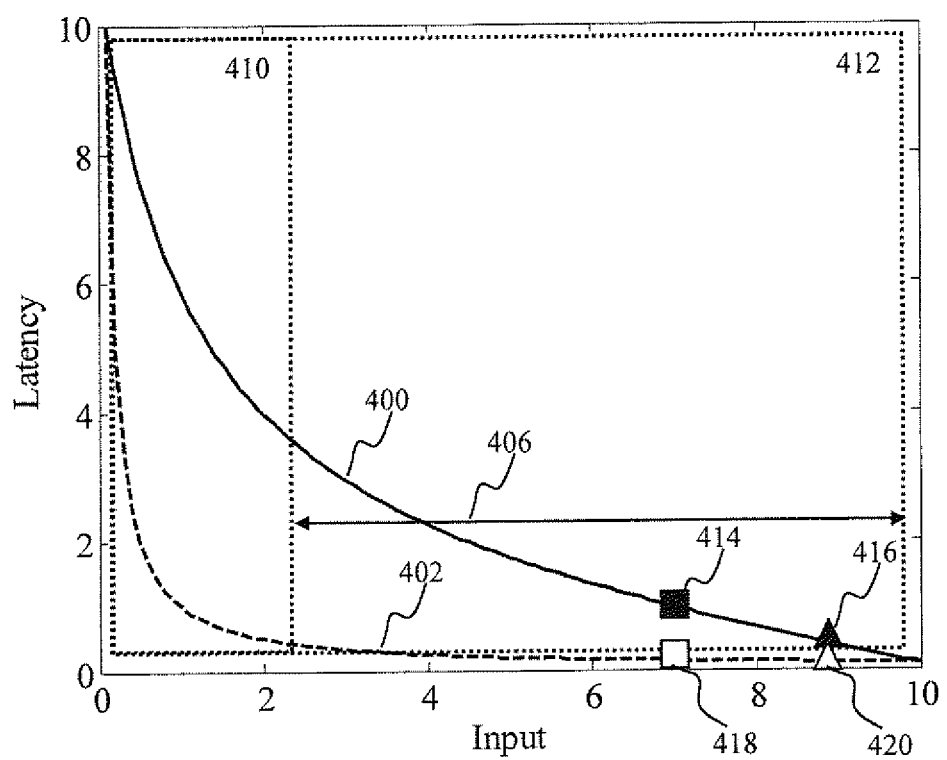
FIG. 4 is a plot depicting latency as a function of input magnitude, in accordance with one implementation of the disclosure.

Curves 402, 404 of FIG. 4 depict latency output as a function of input into an encoder obtained using a latency encoder of the prior art, and a latency encoder configured based on input signal scaling of the present disclosure, respectively. Rectangle 410 in FIG. 4 denotes the useful range of the prior art encoder operation. In some implementations, the useful range may (in general) be determined based on two individual inputs with different magnitudes (e.g., I1=7, I2=9, denoted by squares and triangles, respectively, in FIG. 4), thereby causing generation of two latency outputs that are discernible from one another. Discrimination margins for input and latency differentiation may be configured based on the particular application. In some implementations, inputs whose magnitudes differ by at least one unit may be referred to as "different"; latency whose magnitude may differ by at least more than 0.1 may be referred to as "different".

As may be seen from FIG. 4, encoding of the prior art (shown by the open square 418 and the open triangle 420) encode two substantially different inputs (magnitude 7 and 9) into latency values that are close in magnitude to one another (e.g., within 0.03). Contrast this outcome with the data obtained using input scaling of the disclosure (curve 400) which is capable of encoding the same two inputs (solid rectangle 414 and solid triangle 416) into latency values that are clearly distinct from one another (e.g., by 0.6). Transformation of the input (e.g., using methodology of Eqn. 16) shown in FIG. 4 advantageously enables extension of useful encoding range (shown by rectangle 412) of input, in this example by the amount depicted by the arrow 406.

Figure 5A:
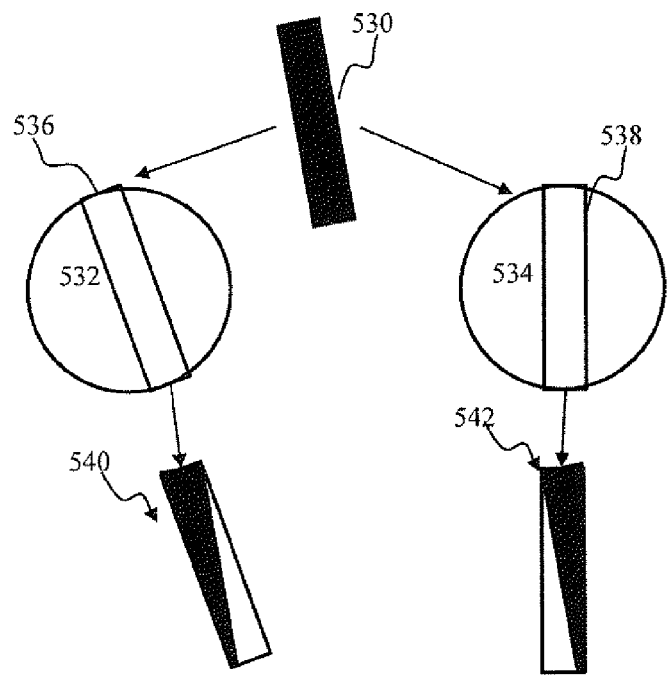
FIG. 5A is a graphical illustration of a sensory stimulus configured to cause similar input into network of FIG. 5B, according to one or more implementations.

In some applications, for example such as illustrated and described with respect to FIG. 5A, multiple nodes of a sensory processing network may receive inputs that may be close to one another in magnitude. By way of illustration and as shown in FIG. 5A, sensory input may comprise e.g., a representation of a bar 530 oriented at 10°. In one or more implementations, the sensory input may comprise for instance an output of an imaging CCD or CMOS/APS array of sensing apparatus. The visual input may comprise digitized frame pixel values (RGB, CMYK, grayscale) refreshed at a suitable rate. Individual frames may comprise representations of an object that may be moving across field of view. In one or more implementations, the sensory input may comprise other sensory modalities, such as somatosensory and/or olfactory, or yet other types of inputs (e.g., radio frequency waves, ultrasonic waves), as will be recognized by those of ordinary skill given the present disclosure.

The input 530 may be provided to a plurality of neurons configured to respond to bars of various orientations. Two neurons (e.g., 534, 532) may be configured for example to respond to a vertically oriented bar and bar oriented at 20°, respectively. The resultant stimulus into neurons 532, 534 may be determined based on a intersection of the bar representation 530 and the respective receptive field (e.g., 536, 538). In some implementations, the intersection may comprise a product of input pixels within the bar 530 and the receptive field; the resultant stimulus may be determined as e.g., a weighted average of pixels within the intersect area, e.g., shown by the black shapes 540, 542, respectively. The capability to encode similar stimuli into distinct latency values (that are separated from one another by wider margin as compared to the prior art) may improve the operation of neuron network encoders configured to process sensory signals comprising stimuli of close magnitudes (e.g., 540, 542).

It is noteworthy that both of the inputs 506, 508 may be configured at a comparatively large amplitude (e.g., in the top 50% percentile) in order to cause a response due to presence of a single, well-defined feature. Accordingly, simple linear input compression (e.g., lowering of the input strengths) of the prior art may be insufficient for causing the inhibition configuration illustrated and described with respect to FIGS. 5A-5B.

Figure 5B:
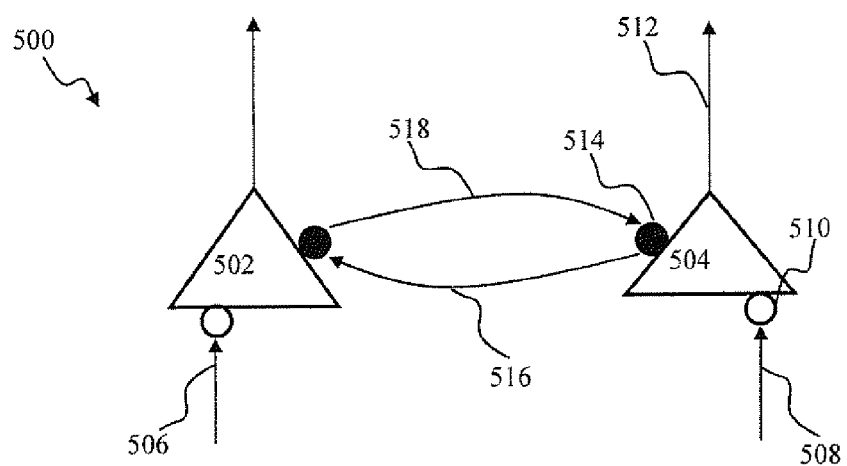
FIG. 5B is a graphical illustration of a network comprising unit inhibition that is configured based on input scaling, according to one or more implementations.

FIG. 5B illustrates network 500 comprising neurons 502, 504 configured to receive inputs 506, 508. In order to enable competition, the neurons 502, 504 may be coupled to one another via inhibitory connections 516, 518. In or more implementations, the inputs 506, 508 may comprise output of detector network layer configured to detect one or more features (e.g., an edge) and/or objects. By way of illustration, input 508 may comprise magnitude of 7, while input 506 may comprise magnitude of 7.7. In accordance with encoding implementation comprising input scaling and shown by the curve 400 in FIG. 4, stronger input 508 may cause an earlier response by the neuron 504, compared to the response by the neuron 502 responsive to the input 506. The timing difference (e.g., of 0.23 for the encoding of curve 406) between the responses of two neurons may enable the neuron 504 to provide an inhibitory signal via the connection 516 to the neuron 502 configured with sufficient latency margin. In one or more implementations, the latency margin between the occurrence of the input 506, 508 and occurrence of the inhibition signal 516, 516, respectively may be selected from the range between 1 ms and 10 ms, although it will be readily appreciated that other values may be used as well consistent with the disclosure.

Inhibitory signal of sufficient efficacy provided by the neuron 504 via the connection 516 may delay, and/or altogether prevent generation of response by the neuron 502. Any applicable inhibition mechanisms may be utilized, such as for example the mechanisms described in U.S. patent application Ser. No. 13/548,071, entitled "SPIKING NEURON NETWORK SENSORY PROCESSING APPARATUS AND METHODS", filed Jul. 12, 2012, and/or U.S. patent application Ser. No. 13/710,042, entitled "CONTRAST ENHANCEMENT SPIKING NEURON NETWORK SENSORY PROCESSING APPARATUS AND METHODS", filed Dec. 10, 2012, each of the foregoing being incorporated herein by reference in its entirety. Inhibition of the neuron 502 by the neuron 504 (and/or vice versa). Inhibition of one of the neurons 502, 504 may advantageously enable a single neuron (of neurons 502, 504) to responds to a given feature, and/or prevent synchronous response by many neurons to the same feature thereby increasing input differentiation. It is noteworthy that the network configuration of the prior art (e.g., without input scaling) may cause near-simultaneous responses by both neurons 502, 504, thereby not providing or allowing for the ability to discriminate between receptive fields 536, 538.

Figure 6:
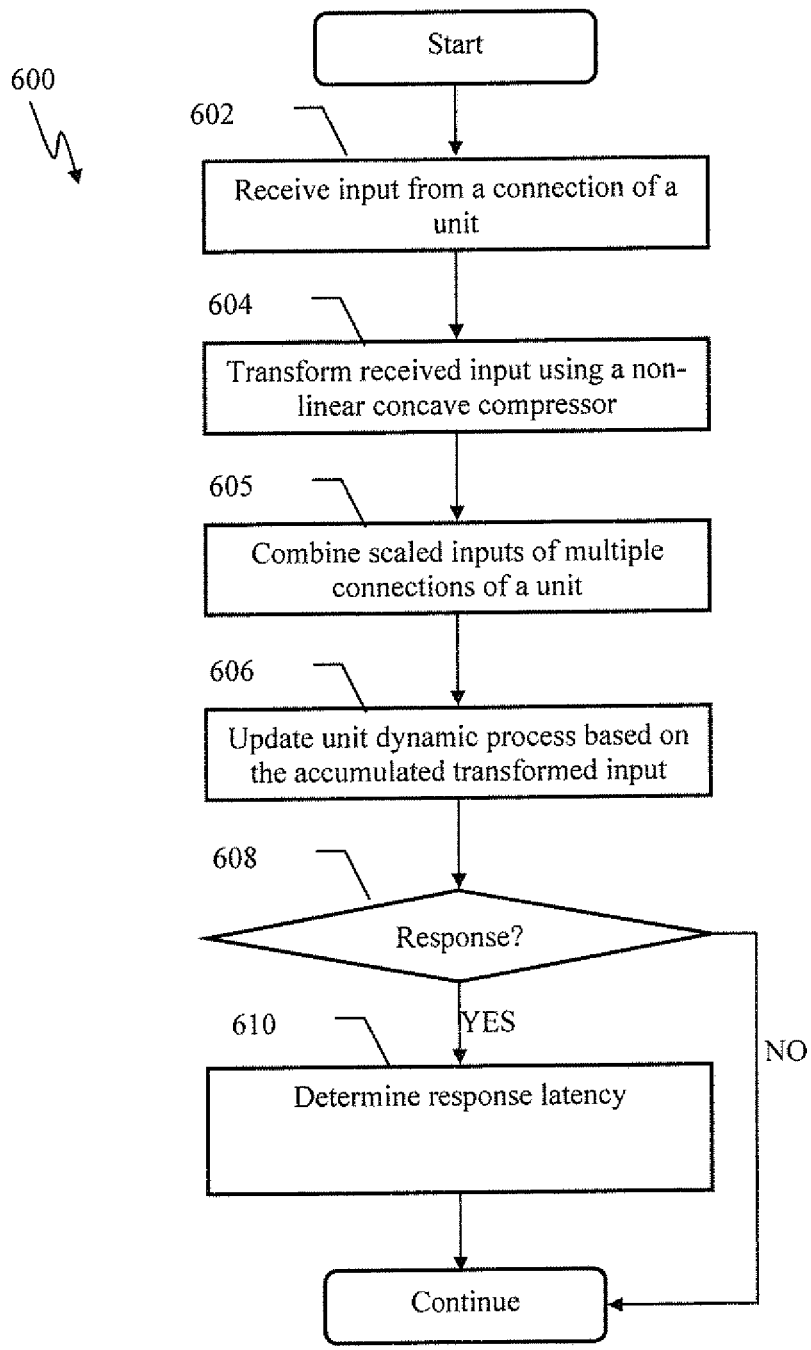
FIG. 6 is a logical flow diagram illustrating a method of response generation by a neuron based on accumulation of multiple compressed of inputs from individual synapses, in accordance with one or more implementations.
Figure 7:
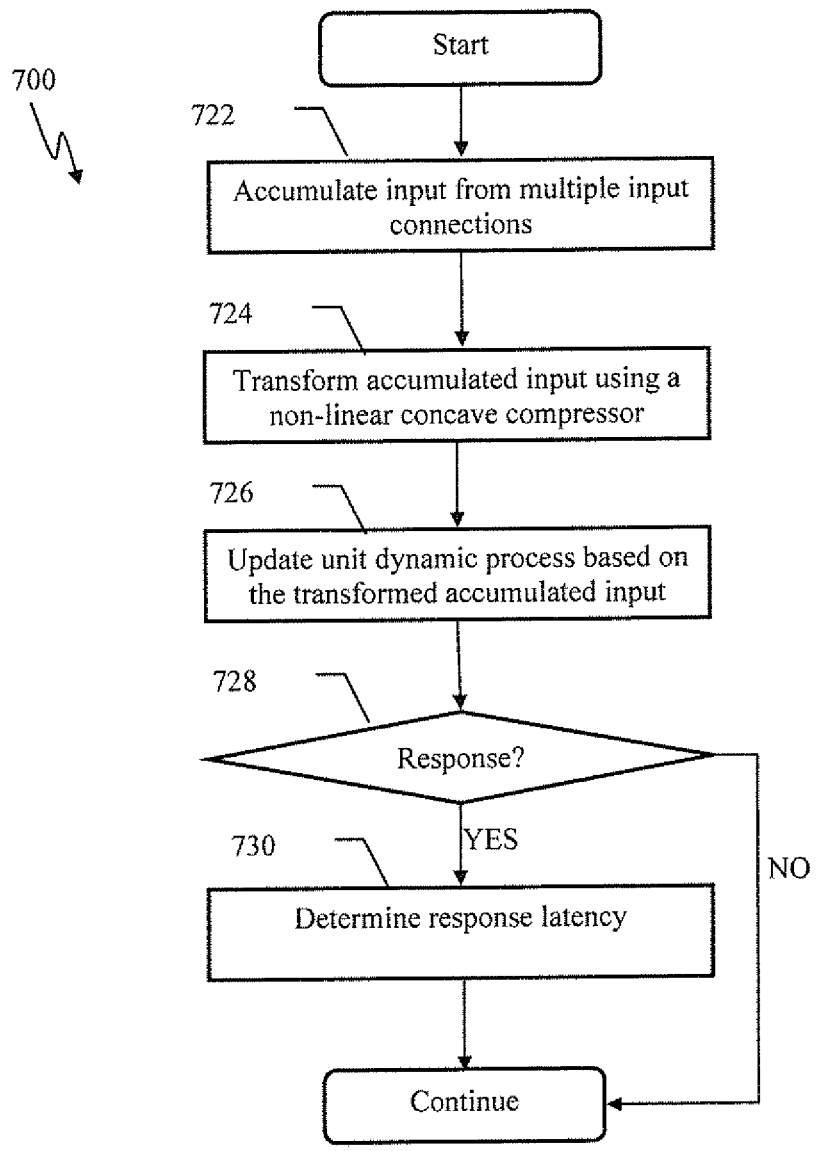
FIG. 7 is a logical flow diagram illustrating a method of response generation by a neuron based on compression of accumulated inputs from multiple synapses, in accordance with one or more implementations.
Figure 8:
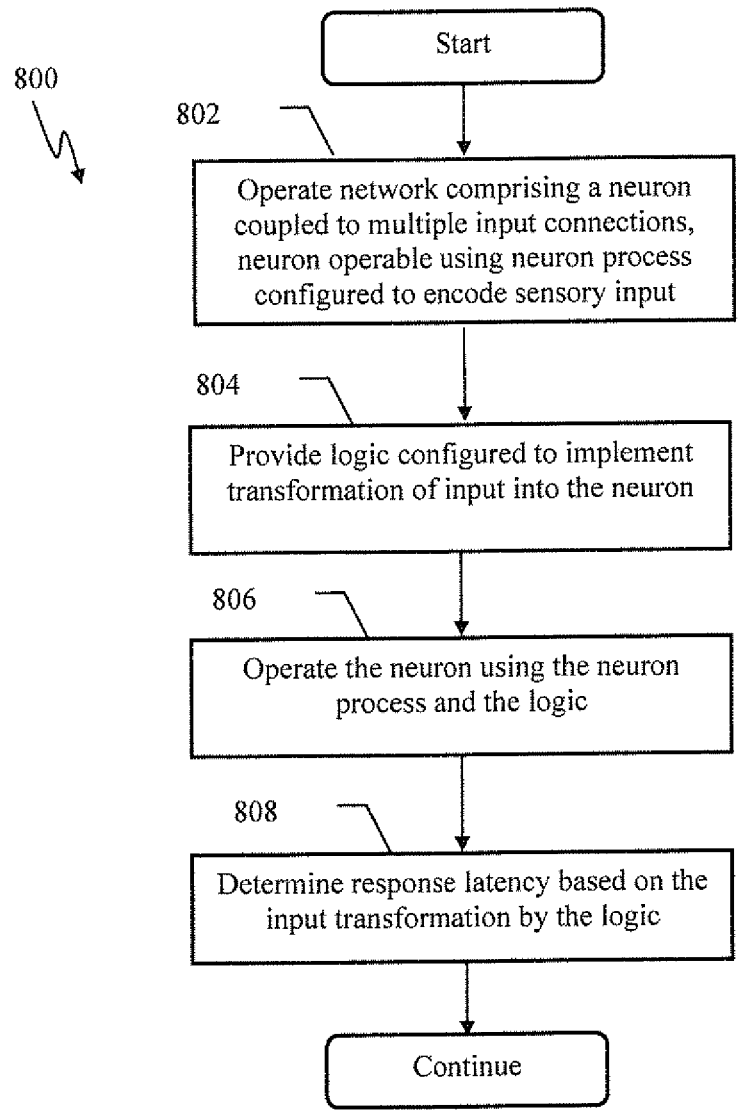
FIG. 8 is a logical flow diagram illustrating sensory input encoding by a spiking neuron network characterized by an expanded dynamic range of the input, in accordance with one implementation of the disclosure.

FIGS. 6-8 illustrate exemplary methods of using the non-linear input summation mechanism(s) described herein for operating neuron networks. The operation of the exemplary methods 600, 700, 800 presented below are intended to be merely illustrative, and in no way limiting on the broader principles of the disclosure. In some implementations, methods 600, 700, 800 may be accomplished with one or more additional operations not described, and/or without one or more of the operations discussed. Additionally, the order in which the operations of methods 600, 700, 800 (or individual steps or sub-steps therein) are illustrated in FIGS. 6-8 and described below is not intended to be limiting.

In some implementations, the methods 600, 700, 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700, 800 in response to instructions stored electronically on an electronic storage medium. The one or more processing devices may include one or more devices configured through hardware, firmware, and/or software to be specifically designed for execution of one or more of the operations of the methods 600, 700, 800.

At operation 602 of the method 600, illustrated in FIG. 6, an input may be received from a given connection of a unit (e.g., the connection 104 of unit 110 in FIG. 1). In one or more implementations, the input may comprise e.g., one or more spikes configured based on presence of an object.

At operation 604 the input for the given connection may be transformed. In one or more implementations, the input transformations may be based on a non-linear concave scaling function, such as, for example, that described with respect to FIG. 2 and/or Eqn. 4.

At operation 606, the transformed input(s) of multiple connections into the unit may be combined. In one or more implementations, the input combination may comprise e.g., a weighted sum.

At operation 608, the unit dynamic process may be updated based on the accumulated transformed input obtained at operation 606. In some implementations, the neuron update may be effectuated using, for example, Eqn. 8.

At operation 610, a determination may be made as to whether response is to be generated by the neuron based on the updated excitability. In one or more implementations, the response generation may be based on e.g., the membrane potential of the neuron process breaching a firing threshold.

At operation 612, latency of a response may be determined. In some implementations, the latency determination of operation 612 may be characterized by an expanded dynamic range of the input, e.g., such as that shown in FIG. 4.

FIG. 7 illustrates an exemplary method of response generation by a neuron based on transformation of accumulated inputs from multiple synapses, in accordance with one or more implementations.

At operation 722 of method 700, illustrated in FIG. 7, an input into a unit of a network may be accumulated. In some implementations, input accumulation may be based on a combination of inputs be received by the unit via multiple connections (e.g., the connection 104 of unit 110 in FIG. 1). The combination may comprise for instance a weighted sum. In one or more implementations, the input may comprise one or more spikes configured based on, e.g., presence of an object (e.g., the bar 530 in FIG. 5A).

At operation 724, the accumulated input may be transformed. In one or more implementations, the input transformation may be based on a non-linear concave function, such as, for example, that described with respect to FIG. 2 and/or Eqn. 4.

At operation 726, a unit dynamic process may be updated based on the accumulated transformed input obtained at operation 726. In some implementations, the neuron update may be effectuated using, for example, Eqn. 8.

At operation 728, a determination may be made as to whether response is to be generated by the neuron based on the updated excitability. In one or more implementations, the response generation may be based on the membrane potential of the neuron process breaching a firing threshold.

At operation 730, a latency of a response may be determined. In some implementations, the latency determination of operation 730 may be characterized by an expanded dynamic range of the input, e.g., such as shown in FIG. 4.

FIG. 8 illustrates an exemplary increased sensitivity method for encoding a magnitude of a sensory input to a neuron into latency, such as for use in a signal processing spiking neuron network processing sensory input, in accordance with one implementation of the disclosure.

At operation 802 of method 800 of FIG. 8, a network may be operated. The network may comprise one or more neurons operable in accordance with neuron process. The neuron process may be codified to encode sensory input. In one or more implementations, the sensory input may comprise visual input, such as for example, ambient light received by a lens in a visual capturing device (e.g., telescope, motion or still camera, microscope, portable video recording device, smartphone, security camera, IR sensor). In some cases, the visual input encoded at operation 602 may comprise for instance an output of an imaging CCD or CMOS/APS array of sensing device. For example, processing apparatus used with method 700 may be configured for the processing of digitized images (e.g., portable video recording and communications device). The visual input of step 602 may comprise digitized frame pixel values (RGB, CMYK, grayscale) refreshed at a suitable rate. Individual frames may comprise representations of an object that may be moving across field of view of the sensor. In some applications, such as, an artificial retinal prosthetic, the input of operation 602 may be a visual input, and the encoder may comprise for example one or more diffusively coupled photoreceptive layer as described in U.S. patent application Ser. No. 13/540,429, entitled "SENSORY PROCESSING APPARATUS AND METHODS", incorporated supra. In one or more implementations, the sensory input of operation 602 may comprise other sensory modalities, such as somatosensory and/or olfactory, or yet other types of inputs (e.g., radio frequency waves, ultrasonic waves) as will be recognized by those of ordinary skill given the present disclosure.

Input encoding of operation 802 may be performed using any of applicable methodologies described herein, or yet others which will be recognized by those of ordinary skill given the present disclosure. In some implementations, the encoding may comprise the latency encoding mechanism described in co-owned and co-pending U.S. patent application Ser. No. 12/869,583, entitled "INVARIANT PULSE LATENCY CODING SYSTEMS AND METHODS", filed Aug. 26, 2010, incorporated supra. In one or more implementations, representations of the object (views) may be encoded into spike patterns.

In some implementations of visual input processing, such as described in co-pending and co-owned U.S. patent application Ser. No. 13/623,820, entitled "APPARATUS AND METHODS FOR ENCODING OF SENSORY DATA USING ARTIFICIAL SPIKING NEURONS", filed Sep. 20, 2012, the detector neuron may generate a response indicative of an object being present in sensory input.

At operation 804 of method 800 of FIG. 8, logic may be provided. The logic may interface with a neuron. In some realizations, the logic may be configured to implement transformation of input into the neuron in accordance with, for example, Eqn. 3-Eqn. 19.

At operation 806 of method 800 of FIG. 8 the neuron may be operated using the neuron process and the input transformation by the logic. In one or more implementations, the operation 806 may be configured based on methodology of Eqn. 8, Eqn. 11 and/or other.

At operation 808 of method 800 of FIG. 8 latency of a response generated by the neuron may be determined. The latency may be configured in accordance with the input transformation by the logic, e.g., as shown and described with respect to FIG. 4. By employing the transformation of, e.g., Eqn. 6, encoding dynamic range may be expanded so as to enable encoder operation in a wider range of inputs providing wider range of outputs (e.g., shown by the rectangle 412 in FIG. 4)

Various aspects of the present disclosure may also advantageously be applied to the design and operation of apparatus configured to process sensory data.

In some implementations, where neurons of a network are configured based on a finite difference approach, scaling input(s) into a known range (e.g., using Eqn. 16) may reduce potential network numerical instabilities, and/or enable the network to process inputs of wider dynamic range, compared to the prior art. Widening of the input dynamic range may be of benefit when processing natural stimuli under varying conditions (e.g., video input obtained in bright sunlight, shade, and/or dusk, audio input due to thunder claps, sound of jet engines, whispers, sounds of rustling leaves, and/or explosives noise, and/or other inputs). Network configuration, wherein the input magnitude may be limited to a given range, may allow for an increased iteration time step, thereby reducing computational load associated with the network operation.

In some implementations, input transformation may increase network sensitivity to sparse inputs and/or reduce probability of pathological synchronized activity in the presence of multiple strong inputs. In particular, providing inputs to a neuron that are configured within a given range may enable use of faster fixed step integration methods of the neuronal state, compared to providing of inputs in a varying range. Use of the transformation methodology describe herein may enable to obtain and/or utilize strong individual synapses (e.g., synapses characterized by larger efficacy) as compared to the prior art solutions. Stronger individual synapses may elicit neuron response even for weaker inputs (compared to the prior art) thus enabling the network to respond to less frequent and/or weaker stimuli. Combining an ability of the network to respond to both strong inputs (e.g., intensity values in the top $25^{th}$ percentile) with the ability to respond to weaker values (e.g., intensity values within the lower $25^{th}$ percentile) may enable processing of inputs in a wider dynamic range without the need to tune the network. Furthermore, ability to differentiate individual high-magnitude (e.g., top $25^{th}$ percentile) inputs by individual neurons employing input transformation, may enable selective response to individual high-magnitude inputs with greater latency discrimination, compared to the prior art.

The exemplary embodiments of the input transformation approach of the disclosure may obviate the need for explicit connection weight management (via, e.g., ad hoc or dynamic thresholds) of the prior art, thereby advantageously simplifying network operation and/or reducing computational load associated with the network operation. Such computational efficiencies may be leveraged for e.g., reducing energy use, utilization of less costly, and/or simpler computational platform for fulfilling a given task, as compared to the prior art.

In one or more implementations of latency input encoding/input transformation described herein may enable encoding of two or more inputs of similar magnitudes into latency values that are separated by a wider margin compared to the prior art. Such outcome may, inter alia, reduce (and/or altogether prevent) synchronous response by multiple neurons of the network to the same stimulus, thereby increasing receptive field variability, and allowing to discriminate larger number of features in the input. In one or more implementations, input scaling may extend operating range of the encoder neuron, (e.g., illustrated in FIG. 4), compared to the prior art.

In one or more implementations, the transformation may be configured (e.g., as shown by Eqn. 19) to pass through unchanged inputs of certain magnitude. Such realizations may enable incorporation of the transformation functionality into existing networks and/or existing neuron models such as via, e.g., a plug-in. The plug-in functionality may be aided by configuring the input transformation independent of the synapse dynamic process.

In some implementations, input scaling may comprise compression of the input dynamic range thereby enabling neuron stable operation when receiving inputs from a large number (1,000 to 10,000) of connections while at the same time maintaining near-threshold operation configured to respond to inputs from as few as two connections.

Exemplary embodiments of processes and architectures for providing input scaling functionality are disclosed herein as well. In one exemplary implementation, a web-based repository of network plug-ins "images" (e.g., processor-executable instructions configured to implement input transformation and/or scaling in a neuron network) is introduced. Developers may utilize e.g., a "cloud" web repository to distribute the input transformation plug-ins. Users may access the repository (such as under a subscription, per-access, or other business model), and browse plug-ins created by developers and/or other users much as one currently browses online music download venues. Plug-in modules may be also offered (e.g., for purchase, as an incentive, free download, or other consideration model) via the repository in an online "app" store model. Other related content such as user-created media (e.g., a code and/or a description outlining the input transformation methodology) may available through the repository, and social forums and links.

Figure 9:
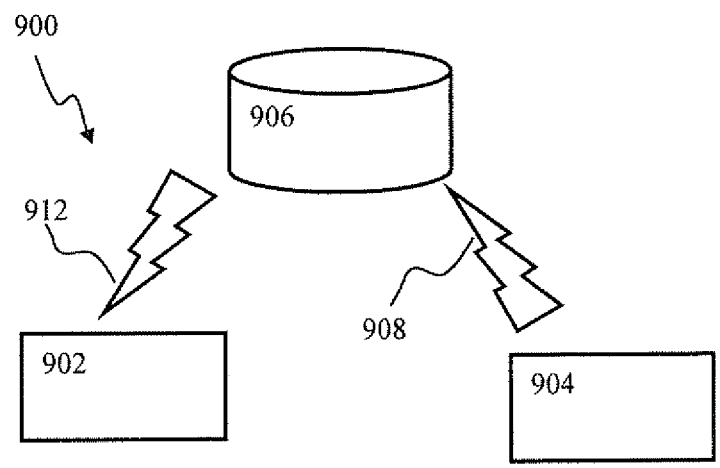
FIG. 9 is a block diagram illustrating a computerized system for distributing application packages, in accordance with one or more implementations.

FIG. 9 illustrates one exemplary realization of a computerized system for distributing application packages (e.g., plug-ins). The system 900 may comprise a cloud server depository 906. In FIG. 9, one or more remote user devices 904 may connect via a remote link 908 to the depository 906 in order to save, load, and/or update their neural network configuration, and/or other content. Such content may include without limitation, media related to the processing data using neuron networks, collected sensor data, wiki entries on training techniques/experiences, forum posts, instructional videos, etc.), network state images, connectivity maps, third-party/homebrew modifications, and/or other media. Users may also form user groups to collaborate on projects, or focus on specific topics, or even on the collective formation of a brain image (somewhat akin to extant distributed gaming interaction). In some implementations, user may also cross-link to groups and content on third-party social media websites (e.g. Facebook®, Twitter®, etc.).

In one or more implementations, the link 908 may comprise a wired network (Ethernet, DOCSIS modem, T1, DSL), wireless (e.g. Wi-Fi, Bluetooth, infrared, radio, cellular, millimeter wave, satellite), or other link such as a serial link (USB, FireWire, Thunderbolt, etc.). One or more computerized devices 902 may communicate with the cloud server depository 906 via link 912. The computerized devices may correspond for instance to a developer's computer apparatus and/or systems. Developers may utilize the server 906 to store their application packages. In some implementations, the server 906 may enable a direct or indirect connection between the developer 902 and user 904 device in order to install the application package, troubleshoot user's network operation, an/or perform other actions. In one or more implementations, links 912 and/or 908 may comprise an internet connection, etc. effectuated via any of the applicable wired and/or wireless technologies (e.g., Ethernet, WiFi, LTE, CDMA, GSM, etc).

In some implementations, a virtual "storefront" may be provided as a user interface to the cloud. From the storefront, users may access purchasable content (e.g. plug-ins, source code, technical description and/or firmware packages). Purchasable content allows users to conveniently obtain quality content to enhance their user experience; the quality may be controlled under any number of different mechanisms, such as e.g., peer review, user rating systems, functionality testing before the image is uploadable or made accessible.

The cloud may act as an intermediary that may link plug-ins with tasks, and users with plug-ins to facilitate use of neuron networks for signal processing. For example, a user of a network characterized by dense connectivity (e.g., neurons with thousands of synapses) may have difficulty performing certain task. A developer may have an application well suited for the task, but he does not have access to individual networks/users. A cloud service may notify the user about the relevant images suited to the task. In some implementations, the users may request assistance with the task. In various implementations, the cloud server may be configured to identify users using networks for specific tasks (via one or more monitoring functions), and alert users that help may be available. The notification may be based on one or more parameters, including for example the hardware/software configuration of the network, types of inputs, connectivity mapping, geographical location (e.g. proximity of user to developer), keywords, or other parameters.

A subscription model may also or alternatively be used. In various implementations, a user may gain access to content based on a periodic payment or other remuneration paid to the administrator of the networked service, or their designated proxy/agent. A hybrid model may also be used. In one such variant, an initial/periodic subscription fee allows access to general material, but premium content requires a specific (additional) payment.

Other users that develop skill in training, or those that develop popular brain images, may wish to monetize their creations. The exemplary storefront implementation provides a platform for such enterprise. Operators of storefronts may desire to encourage such enterprise both for revenue generation, and/or for enhanced user experience. Thus, consistent with the present disclosure, the storefront operator may institute competitions with prizes for the most popular/optimized application packages, modifications, and/or media. Consequently, users may be motivated to create higher quality content. Alternatively, the operator may also (in or in lieu of a contest) instate a system of revenue and/or profit sharing for purchasable content. Thus, hobbyists and casual developers may see a reasonable return on their efforts. Such a system may also attract professional developers. Users as a whole may benefit from a wider array of content offerings from more skilled developers. Further, such revenue or profit sharing may be complemented or replaced with a system of internal credits for developers. Thus, contributors have expanded access to paid or otherwise limited distribution materials.

In various implementations, the cloud model may offer access to competing provider systems of application packages. A user may be able to reprogram/reconfigure the software elements of the system to connect to different management systems. Thus, competing application provision systems may spur innovation. For example, application provision systems may offer users more comprehensive packages ensuring access to applications optimized for a wide variety of tasks to attract users to their particular provision network, and (potentially) expand their revenue base.

The principles described herein may also be combined with other mechanisms of data encoding in neural networks, such as those described in U.S. patent application Ser. No. 13/152,084 entitled "APPARATUS AND METHODS FOR PULSE-CODE INVARIANT OBJECT RECOGNITION", filed Jun. 2, 2011, and U.S. patent application Ser. No. 13/152,119, filed Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, various of the teachings of the disclosure can be used to simplify tasks related to motion estimation, such as where an image sequence is processed to produce an estimate of the object position and velocity (either at each point in the image or in the 3D scene, or even of the camera that produces the images). Examples of such tasks include ego motion, i.e., determining the three-dimensional rigid motion (rotation and translation) of the camera from an image sequence produced by the camera, and following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method of operating a node of network, the method comprising:
   scaling individual inputs of a plurality of inputs received by the node via a plurality of connections, the scaling using at least a transformation to produce a plurality of scaled inputs; and
   updating a state of the node based on at least combining the plurality of scaled inputs, the updating configured to cause the node to generate a response based on at least the updated state of the node breaching a threshold;
   wherein:
      the individual inputs of the plurality of inputs comprise a first value, and the plurality of scaled inputs comprise a second value that is larger than the first value; and
      the transformation comprises a concave function of the plurality of inputs, the concave function configured to increase the first value to produce a third value, and to decrease the second value to produce a fourth value.

2. The method of claim 1, wherein:
   individual ones of the plurality of connections are characterized by efficacy configured to advance or delay onset of the response generation; and
   the method further includes adjusting a given efficacy of a given one of the plurality of connections based on at least a time interval between a time of the response onset and a time of input of the plurality of inputs associated with the given one of the plurality of connections.

3. The method of claim 2, wherein:
   the transformation comprises a first transformation mode characterized by the plurality of scaled inputs being configured equal to a respective individual input within a first transformation range, and a second transformation mode characterized by the plurality of scaled inputs being configured to be different from the respective individual input within a second transformation range;
   the adjusting the given efficacy of the given one of the plurality of connections is configured based on a connection update process; and
   the first transformation mode is configured to utilize the connection update process.

4. The method of claim 1, wherein:
   the combination of the plurality of scaled inputs comprises producing a combined input characterized by a first magnitude range; and
   the transformation comprises converting input values within the first magnitude range into values within a second magnitude range, the second magnitude range comprising a prescribed upper end.

5. The method of claim 1, wherein the transformation comprises a concave function of the plurality of inputs.

6. The method of claim 5, wherein, the concave function comprises one or more of a logarithm and a power law characterized by an exponent value smaller than one.

7. The method of claim 1, wherein,
   the individual inputs of the plurality of inputs comprises a fifth value that is at least two times greater than the second value; and
   the transformation comprises decreasing the fifth value to a sixth value that is within ten percent (10%) of the fourth value.

8. The method of claim 1, further comprising:
   updating the state in accordance with a dynamic process at a plurality of time intervals;
   the combination of the plurality of scaled inputs comprises producing a combined input associated with a given update interval of the plurality of time intervals;
   configuring the updated state of the node based on the combined input and at least one other combined input obtained during another update interval of the plurality of time intervals prior to the given update interval, the at least one other combined input configured based at least on a combination of other scaled inputs received by the node prior to the another update interval.

9. The method of claim 8, further comprising:
   decaying the combined input in accordance with a decay process, the decaying configured to reduce a contribution of the combined input for use by a subsequent update of the plurality of time intervals.

10. The method of claim 9, wherein the decay process is selected from the group consisting of: (i) an exponential decay characterized by an exponent; (ii) a linear decay process characterized by an average rate; (iii) a geometric decay; and (iv) a polynomial decay.

11. The method of claim 1, wherein the combining comprises a linear combination.

12. A computerized apparatus configured to convert multiple signals into a latency of a spike, the apparatus comprising:
   a first logic configured to combine individual ones of the multiple signals into a combined signal;
   a second logic in communication with the first logic and configured to transform the combined signal using at least a concave transformation to produce a transformed signal; and
   a third logic in communication with the second logic configured to generate the spike based on at least the transformed signal;
   wherein:
      the latency is configured based at least on a function of the transformed signal;
      the function is configured to produce first and second latency values based on first and second values of the transformed signal, respectively; and
      a first ratio of the first latency value to the second latency value is greater than a second ratio of the first value of the transformed signal to the second value of the transformed signal.

13. The apparatus of claim 12, wherein for the second ratio of 1.1, the first ratio is greater than 1.2.

14. The apparatus of claim 12, wherein:
   the multiple signals comprise at least one-thousand (1000) signals received via a plurality of connections, individual ones of the at least one-thousand (1000) signals characterized by an input magnitude value that is sufficient to cause the spike; and
   a magnitude of the transformed signal is configured to be no greater than a multiple of five (5) of the input magnitude value.

15. The apparatus of claim 12, wherein:
   responsive to a magnitude of the combined signal being greater than one (1), a magnitude of the transformed signal is no greater than one (1); and the third logic is configured to enable generation of the spike responsive to a number of multiple signals being equal to two (2).

16. A method of operating a node of network, the method comprising:
scaling individual inputs of a plurality of inputs received by the node via a plurality of connections, the scaling using at least a transformation to produce a plurality of scaled inputs;
updating a state of the node based on at least combining the plurality of scaled inputs, the updating configured to cause the node to generate a response based on at least the updated state of the node breaching a threshold; and
decaying the combined input in accordance with a decay process, the decaying comprising reducing a contribution of the combined input for use by a subsequent update of the plurality of time intervals;
updating the state in accordance with a dynamic process at a plurality of time intervals;
wherein the combining the plurality of scaled inputs comprises producing a combined input associated with a given update interval of the plurality of time intervals; and
the updated state of the node is configured based on the combined input and at least one other combined input obtained during another update interval of the plurality of time intervals prior to the given update interval, the at least one other combined input configured based at least on a combination of other scaled inputs received by the node prior to the another update interval;
wherein:
the individual inputs of the plurality of inputs comprise a first value, and the plurality of scaled inputs comprise a second value that is larger than the first value; and
the transformation comprises a concave function of the plurality of inputs, the concave function configured to increase the first value to produce a third value, and to decrease the second value to produce a fourth value.

17. The method of claim 16, wherein:
individual ones of the plurality of connections are characterized by efficacy configured to advance or delay onset of the response generation; and
the method further includes adjusting a given efficacy of a given one of the plurality of connections based on at least a time interval between a time of the response onset and a time of input of the plurality of inputs associated with the given one of the plurality of connections.

18. The method of claim 17, wherein:
the transformation comprises a first transformation mode characterized by the plurality of scaled inputs being configured equal to a respective individual input within a first transformation range, and a second transformation mode characterized by the plurality of scaled inputs being configured to be different from the respective individual input within a second transformation range;
the adjusting the given efficacy of the given one of the plurality of connections is configured based on a connection update process; and
the first transformation mode is configured to utilize the connection update process.

19. The method of claim 16, wherein:
the combination of the plurality of scaled inputs comprises producing a combined input characterized by a first magnitude range; and
the transformation comprises converting input values within the first magnitude range into values within a second magnitude range, the second magnitude range comprising a prescribed upper end.

20. The method of claim 16, wherein the decay process is selected from a group consisting of: (i) an exponential decay characterized by an exponent; (ii) a linear decay process characterized by an average rate; (iii) a geometric decay; and (iv) a polynomial decay.

* * * * *